United States Patent
Yamazaki (10) Patent No.: US 12,285,792 B2
(45) Date of Patent: Apr. 29, 2025

(54) SETUP CONDITION DETERMINING METHOD FOR MANUFACTURING FACILITIES, MILL SETUP VALUE DETERMINING METHOD FOR ROLLING MILL, MILL SETUP VALUE DETERMINING DEVICE FOR ROLLING MILL, PRODUCT MANUFACTURING METHOD, AND ROLLED MATERIAL MANUFACTURING METHOD

(71) Applicant: JFE Steel Corporation, Tokyo (JP)

(72) Inventor: Tatsuya Yamazaki, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 345 days.

(21) Appl. No.: 17/429,819

(22) PCT Filed: Oct. 4, 2019

(86) PCT No.: PCT/JP2019/039304
§ 371 (c)(1),
(2) Date: Aug. 10, 2021

(87) PCT Pub. No.: WO2020/166124
PCT Pub. Date: Aug. 20, 2020

(65) Prior Publication Data
US 2022/0126339 A1    Apr. 28, 2022

(30) Foreign Application Priority Data
Feb. 12, 2019   (JP) ................................ 2019-022839

(51) Int. Cl.
*B21B 37/00* (2006.01)
*G05B 19/418* (2006.01)

(52) U.S. Cl.
CPC ........ *B21B 37/00* (2013.01); *G05B 19/41885* (2013.01); *G05B 2219/33034* (2013.01)

(58) Field of Classification Search
None
See application file for complete search history.

(56) References Cited

U.S. PATENT DOCUMENTS 5,414,619 A      5/1995   Katayama et al.
5,586,221 A  *  12/1996   Isik ..................... G05B 13/027
                                                           700/78

(Continued)

FOREIGN PATENT DOCUMENTS

CN         101683659 A      3/2010
CN         107486475 A     12/2017

(Continued)

OTHER PUBLICATIONS

Hong, W. K., et al. "Flatness control of strip in continuous hot rolling processes." 2003 European Control Conference (ECC). IEEE, 2003. (Year: 2003).*

(Continued)

*Primary Examiner* — Carlos R Ortiz Rodriguez
(74) *Attorney, Agent, or Firm* — DLA Piper LLP (US)

(57) ABSTRACT

A set condition determining method for manufacturing facilities includes: inputting, into a trained model, a manufacturing condition for a target product and a setup condition that is for a product manufactured in same manufacturing facilities before manufacture of the target product and that reflects setup condition modification by an operator's manual manipulation; and obtaining a setup condition for the target product. The trained model has been trained with input being: manufacturing conditions for the target product; and setup conditions that are for the product manufactured in the same manufacturing facilities before the manufacture of the target product and that reflect setup condition modification by an operator's manual manipulation, and output being setup conditions for the target product.

5 Claims, 7 Drawing Sheets

LEARNING PHASE

RECOGNIZING PHASE (56) References Cited

U.S. PATENT DOCUMENTS

| | | | |
|---|---|---|---|
| 5,930,136 | A | 7/1999 | Nakajima et al. |
| 6,745,169 | B1 | 6/2004 | Schlang et al. |
| 2018/0341248 | A1 | 11/2018 | Mehr et al. |

FOREIGN PATENT DOCUMENTS

| | | | |
|---|---|---|---|
| CN | 107908836 | A | 4/2018 |
| EP | 0 460 892 | A2 | 12/1991 |
| JP | S59-215205 | A | 12/1984 |
| JP | H05-38511 | A | 2/1993 |
| JP | H07-204718 | A | 8/1995 |
| JP | H08-90020 | A | 4/1996 |
| JP | H08-117827 | A | 5/1996 |
| JP | H09-155420 | A | 6/1997 |
| JP | H10-34216 | A | 2/1998 |
| JP | H10-198402 | A | 7/1998 |
| JP | 3223856 | B2 | 10/2001 |
| JP | 2004-255436 | A | 9/2004 |
| JP | 2010-120047 | A | 6/2010 |

OTHER PUBLICATIONS

Akira Murakami et al., "Optimization of Pass Schedules for a Tandem Cold Mill," Tetsu-to-Hagané, The Iron and Steel Institute of Japan, 2004, vol. 90, No. 11, pp. 95-99 (Abstract).

K. Nakai et al., "Support System of Mill Set-up Model Adjustment," Hitachi Review, vol. 67, No. 4, 1985, pp. 75-78, along with an English Abstract.

Kozo Nakai et al., "Support System of Mill Set-up Model Adjustment," Hitachi Review, 1985, vol. 67, No. 4.

The Extended European Search Report dated Mar. 10, 2022, of counterpart European Patent Application No. 19915005.3.

Office Action dated Dec. 12, 2023, of counterpart Korean Patent Application No. 10-2021-7025534, along with a Concise Statement of Relevance of Office Action in English.

First Office Action dated Feb. 3, 2024, of counterpart Chinese Patent Application No. 201980091804.8, along with an English translation.

* cited by examiner

FIG. 3(a) LEARNING PHASE

FIG. 3(b) RECOGNIZING PHASE

FIG. 4(a) LEARNING PHASE

FIG. 4(b) RECOGNIZING PHASE

SETUP CONDITION DETERMINING METHOD FOR MANUFACTURING FACILITIES, MILL SETUP VALUE DETERMINING METHOD FOR ROLLING MILL, MILL SETUP VALUE DETERMINING DEVICE FOR ROLLING MILL, PRODUCT MANUFACTURING METHOD, AND ROLLED MATERIAL MANUFACTURING METHOD

TECHNICAL FIELD

This disclosure relates to a setup condition determining method for manufacturing facilities, a mill setup value determining method for a rolling mill, a mill setup value determining device for a rolling mill, a product manufacturing method, and a rolled material manufacturing method.

BACKGROUND

Mill setup for rolling mills involves determining the sheet thickness and shape of a rolled material (a coil) at the rolling stand exit, and optimization of setup values for them (mill setup values) is important in terms of stable operation and quality control.

Various methods of automatically performing mill setup have been proposed conventionally, and methods of calculating mill setup values using trained neural networks have been disclosed, for example, in Japanese Unexamined Patent Application, Publication No. H05-038511 and Japanese Unexamined Patent Application, Publication No. H08-090020. Furthermore, a method of modifying mill setup values by performing numerical optimization using sequential quadratic programming on the basis of a mathematical model (a rolling model) has been disclosed in Akira Murakami et al., "Pass Schedule Optimization for a Tandem Cold Mill," Tetsu-to-Hagané, The Iron and Steel Institute of Japan, 2004, Vol. 90, No. 11.

The methods disclosed in JP '511 and JP '020 mentioned above have a problem that when an operator sees the load status of a motor, for example, and manually adjusts the rolling reduction of the stand (when modification by the operator's manual intervention is performed), immediately having the adjustment reflected in the next mill setup is difficult because the mill setup values are determined on the basis of a large volume of data on past records.

Furthermore, the method disclosed in Akira Murakami et al. mentioned above has a problem that the performance changes depending on the precision of the mathematical model because the optimization based on the mathematical model is performed. The method disclosed in Akira Murakami et al. also has a problem that when modification by an operator's manual intervention is performed, immediately having the modification reflected in the next mill setup is difficult, similarly to JP '511 and JP '020.

It could therefore be helpful to provide a setup condition determining method for manufacturing facilities, a mill setup value determining method for a rolling mill, a mill setup value determining device for a rolling mill, a product manufacturing method, and a rolled material manufacturing method that enable determination of setup conditions reflecting a result of setup value modification by manual intervention through an operator's determination.

SUMMARY

I thus provide:

A set condition determining method for manufacturing facilities that includes: inputting, into a trained model, a manufacturing condition for a target product and a setup condition that is for a product manufactured in same manufacturing facilities before manufacture of the target product and that reflects setup condition modification by an operator's manual manipulation; and obtaining a setup condition for the target product, wherein the trained model has been trained with input being: manufacturing conditions for the target product; and setup conditions that are for the product manufactured in the same manufacturing facilities before the manufacture of the target product and that reflect setup condition modification by an operator's manual manipulation, and output being setup conditions for the target product.

Moreover, in the set condition determining method for manufacturing facilities, the setup condition that is for the product manufactured in the same manufacturing facilities before the manufacture of the target product and that reflects the setup condition modification by the operator's manual manipulation is a setup condition for a product manufactured immediately before the target product.

A mill setup value determining method for a rolling mill includes a mill setup value calculating step of: inputting, into a trained model, a mill setup value for a target rolled material and a mill setup value that is for a rolled material manufactured by the same rolling mill before manufacture of the target rolled material and that reflects setup value modification by an operator's manual manipulation; and obtaining a mill setup value for the target rolled material, wherein the trained model has been trained with input being: manufacturing conditions for the target rolled material; and mill setup values that are for the rolled material manufactured by the same rolling mill before the manufacture of the target rolled material and that reflect setup value modification by an operator's manual manipulation, and output being mill setup values for the target rolled material.

Moreover, in the mill setup value determining method for a rolling mill, the trained model includes: a first trained model obtained by training a learning model with input being: manufacturing conditions for a target rolled material; and mill setup values that are for a rolled material manufactured by the same rolling mill before manufacture of the target rolled material and that reflect modification by an operator's manual manipulation, and output being mill setup values for the target rolled material; and a second trained model obtained by training a learning model with input being manufacturing conditions for the target rolled material, and output being mill setup values for the target rolled material, and the mill setup value calculating process includes: obtaining, as output, a mill setup value for the target rolled material by inputting, into the first trained model, a manufacturing condition for the target rolled material and a mill setup value for a rolled material manufactured by the same rolling mill before the manufacture of the target rolled material, if it is determined, on the basis of a predetermined determination condition, that using a previous mill setup value is appropriate; and obtaining, as output, a mill setup value for the target rolled material by inputting, into the second trained model, a manufacturing condition for the target rolled material, if it is determined, on the basis of the predetermined determination condition, that using the previous mill setup value is not appropriate.

Moreover, in the mill setup value determining method for a rolling mill, the trained model is obtained by training a learning model with input being: manufacturing conditions for a target rolled material; manufacturing conditions for a rolled material manufactured by the same rolling mill before manufacture of the target rolled material; and mill setup values that are for the rolled material manufactured by the same rolling mill before the manufacture of the target rolled material and that reflect setup value modification by an operator's manual manipulation, and output being mill setup values for the target rolled material, and the mill setup value calculating process includes obtaining, as output, a mill setup value for the target rolled material by inputting, into the trained model, a manufacturing condition for the target rolled material, a manufacturing condition for the rolled material manufactured by the same rolling mill before the manufacture of the target rolled material, and a mill setup value for the rolled material manufactured by the same rolling mill before the manufacture of the target rolled mill.

A mill setup value determining device for a mill setup process for a rolling mill includes a mill setup value calculating device configured to obtain, as output, a mill setup value for a target rolled material by inputting, into a trained model, a manufacturing condition for the target rolled material and a mill setup value for a rolled material manufactured by the same rolling mill before manufacture of the target rolled material, wherein the trained model is obtained by training a learning model with input being: manufacturing condition for the target rolled material; and mill setup values that are for the rolled material manufactured by the same rolling mill before the manufacture of the target rolled material and that reflect setup value modification by an operator's manual manipulation, and output being mill setup values for the target rolled material.

A product manufacturing method includes: setting a setup condition for manufacturing facilities; and manufacturing a product using the manufacturing facilities, wherein the setup condition has been determined by the above-described setup condition determining method for manufacturing facilities.

A rolled material manufacturing method includes: setting a mill setup value for a rolling mill; and manufacturing a rolled material using the rolling mill, wherein the mill setup value has been determined by the above-described mill setup value determining method for a rolling mill.

I enable a setup condition to be obtained readily by use of a trained model that has been trained by inclusion of relations between setup conditions for the previous product type and setup conditions for the current product type, the setup condition reflecting a result of setup condition modification by manual intervention through an operator's determination.

REFERENCE SIGNS LIST

1 Rolling Mill Facilities
2 Rolling Mill
2a, 2b, 2c, 2d, 2e Rolling Stand
3 Rolling Position Control Device
4 Roll Bender Shift Control Device
5 Process Calculator
6 Mill Setup Value Calculating Device
7 Learning Device

DETAILED DESCRIPTION

A setup condition determining method for manufacturing facilities, a mill setup value determining method for a rolling mill, a mill setup value determining device for a rolling mill, a product manufacturing method, and a rolled material manufacturing method will be described while reference is made to the drawings. This disclosure is not, however, limited to the following example. Furthermore, components in the following example include those that are easily substitutable by those skilled in the art, or include those that are substantially the same.

Mill Setup Value Determining Method

Figure 1:
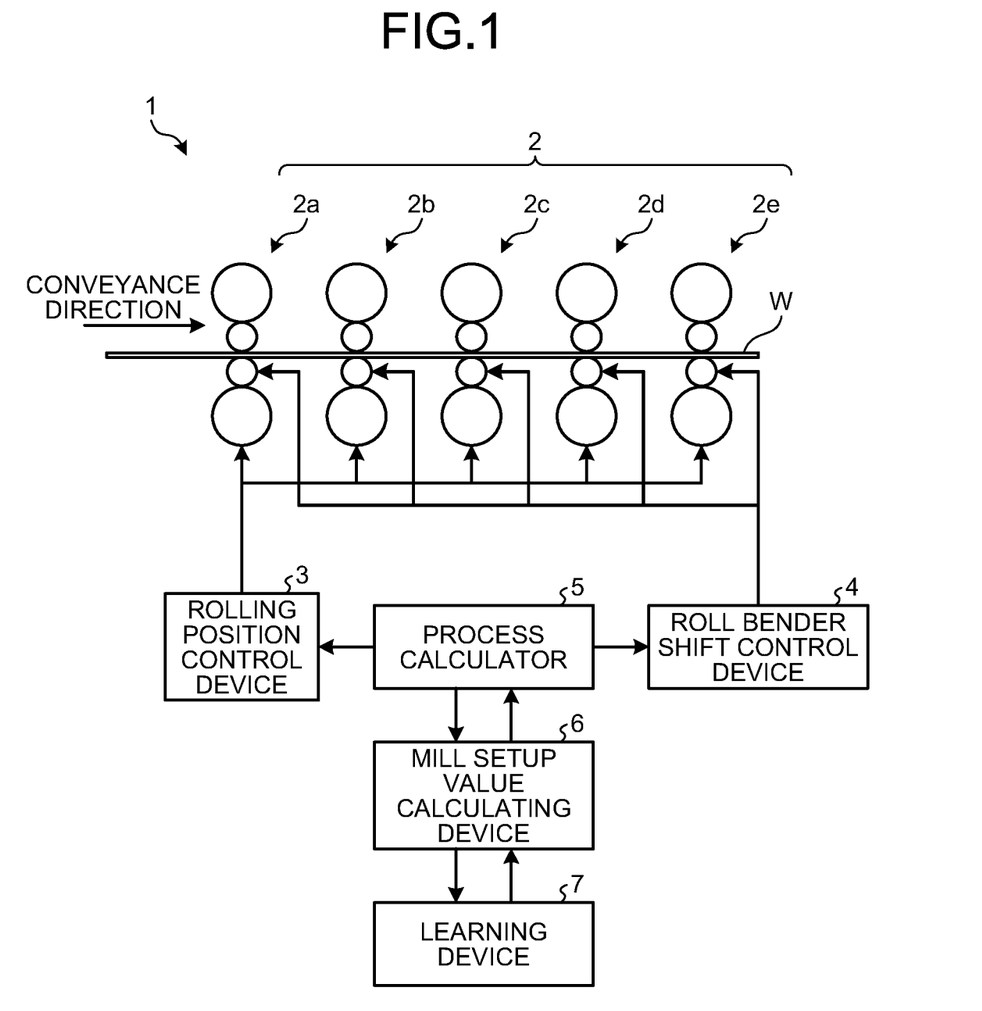
FIG. 1 is a diagram of a schematic configuration having a mill setup value determining device according to an example, the mill setup value determining device having been applied to rolling mill facilities including plural rolling stands.

A mill setup value determining method for a rolling mill, according to an example, is a method for determining mill setup conditions (hereinafter "mill setup values") in a mill setup process for the rolling mill. FIG. 1 illustrates an example where a mill setup value determining device that executes the mill setup value determining method according to the example has been applied to rolling mill facilities 1.

The rolling mill facilities 1 include: a rolling mill 2 having plural rolling stands 2a to 2e that roll a steel sheet (specifically, a coil) W that is a rolled material; a rolling position control device 3 that controls roll gaps of the rolling stands 2a to 2e; a roll bender shift control device 4 that controls roll benders and roll shifts for the rolling stands 2a to 2e; a process calculator 5 that performs mill setup calculation; a mill setup value calculating device 6 that performs calculation of mill setup values; and a learning device 7 that performs machine learning. The mill setup value determining device according to the example includes at least the process calculator 5, the mill setup value calculating device 6, and the learning device 7.

Specifically, the process calculator 5, the mill setup value calculating device 6, and the learning device 7 are implemented by a general purpose information processing device such as a personal computer or a work station, and have, for example, a CPU, a ROM, and a RAM, as main component parts.

The process calculator 5, the mill setup value calculating device 6, and the learning device 7 may respectively be formed of separate devices, or the process calculator 5, the mill setup value calculating device 6, and the learning device 7 may be formed of a single device by including, as software, the mill setup value calculating device 6 and the learning device 7, in the process calculator 5.

On the basis of mill setup values calculated by the mill setup value calculating device 6, the process calculator 5 calculates manipulated quantities for the rolling position control device 3 and the roll bender shift control device 4. On the basis of rolling conditions (manufacturing conditions) for a steel sheet W input from the process calculator 5, the mill setup values are calculated in the mill setup value calculating device 6. By reflecting the mill setup values in rolling schedule calculation, the process calculator 5 changes the manipulated quantities for the rolling position control device 3 and the roll bender shift control device 4.

On the basis of a learned result (a trained model) input from the learning device 7 and rolling conditions for a steel sheet W input from the process calculator 5, the mill setup value calculating device 6 calculates mill setup values for the mill setup process.

The mill setup process refers to a process of setting, according to rolling conditions for a steel sheet W, mill setup values such as allocation of rolling reductions to the rolling stands 2a to 2e (a draft schedule), forward tension, backward tension, roll benders, and roll shifts. Furthermore, rolling conditions for a steel sheet W refer to, for example, a sheet thickness, a sheet width, a steel type, and roll specifications (for example, roll diameters).

In the mill setup process, for example, according to a flow like the one described in Kozo Nakai et al., "Support System of Mill Set-up Model Adjustment," Hitachi Review, Hitachi Review Corporation, 1985, Vol. 67, No. 4, predictive calculation of, for example, rolling loads and rolling torque is performed on the basis of settings of rolling reduction and tension for the rolling stands 2a to 2e, and rolling positions and roll peripheral velocities for changing the travelling sheet thickness are calculated. Furthermore, in the mill setup process, final mill setup values are typically those obtained by: determination of settings for roll benders and roll shifts that largely influence the quality of a steel sheet W (for example, the sheet shape and off-gage) on the basis of material specifications and the above mentioned predicted values for the rolling loads; and manual adjustment of the determined settings by an operator as appropriate.

Figure 2:
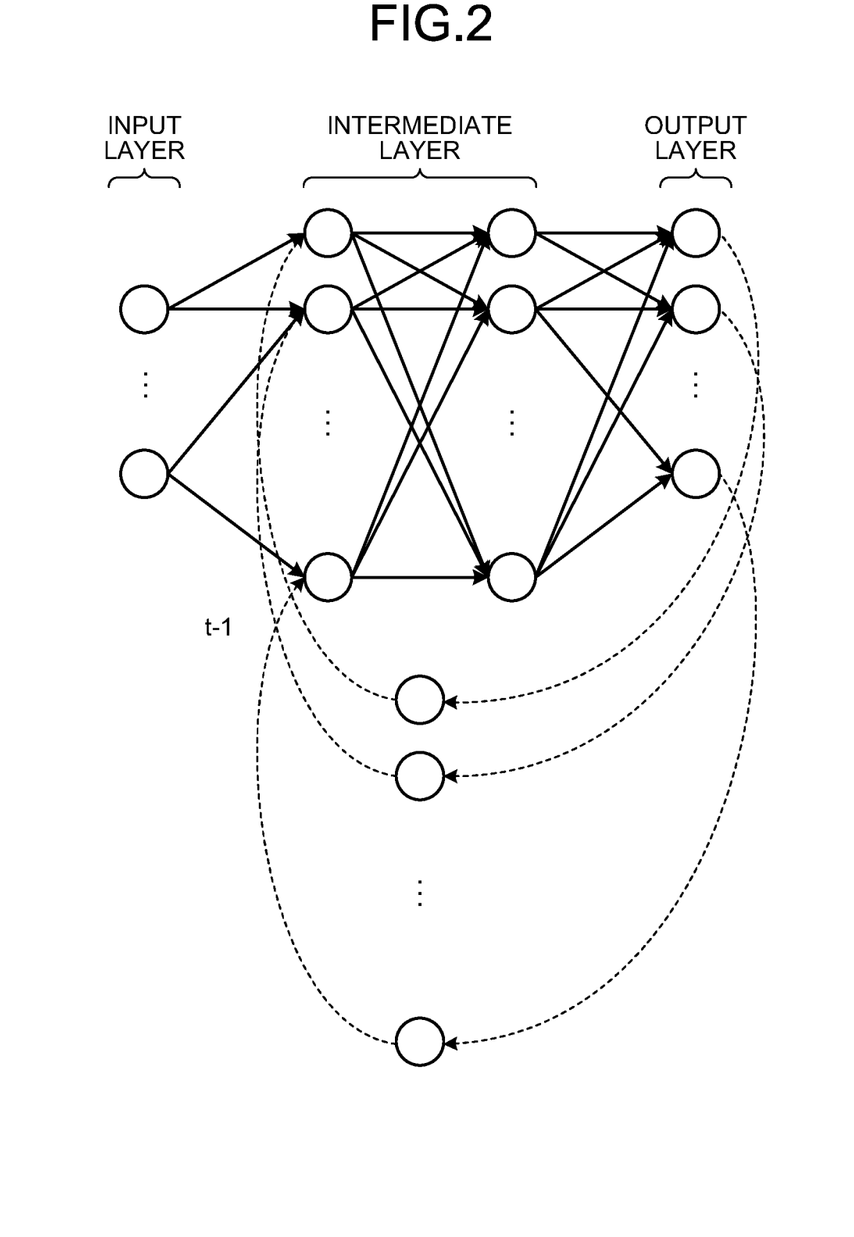
FIG. 2 is a diagram illustrating a configuration of a neural network used in a learning process of a mill setup value determining method according to the example.

The learning device 7 generates a trained neural network that is a trained model by causing a neural network that is a learning model to learn relations between rolling conditions and mill setup values for steel sheets W. FIG. 2 illustrates a configuration of the neural network used in this example. This neural network is formed of an input layer, an intermediate layer having one or more layers, and an output layer. Each of these layers is an affine layer, and output of the intermediate layer has an appropriate activation function such as a sigmoid function.

Furthermore, the neural network used in this example is a recurrent neural network (RNN). A "Jordan network," which is one of RNNs and in which input of its input layer at the same time (=t) and output of its output layer at the previous time (=t−1) are input to its intermediate layer, may be used in this example. An "Elman network," in which input of its input layer at the same time (=t) and output of its intermediate layer at the previous time (=t−1) are input to its intermediate layer, may be used instead of the Jordan network mentioned above. The learning device 7 trains this neural network by using, for example, a backpropagation method, online or offline.

In the conventional methods of determining mill setup values in JP '511 and JP '020 mentioned above, mill setup values are calculated using trained neural networks, and a learning phase and a recognizing phase as illustrated in FIG. 3, for example, are implemented in these conventional methods.

Figure 3A:
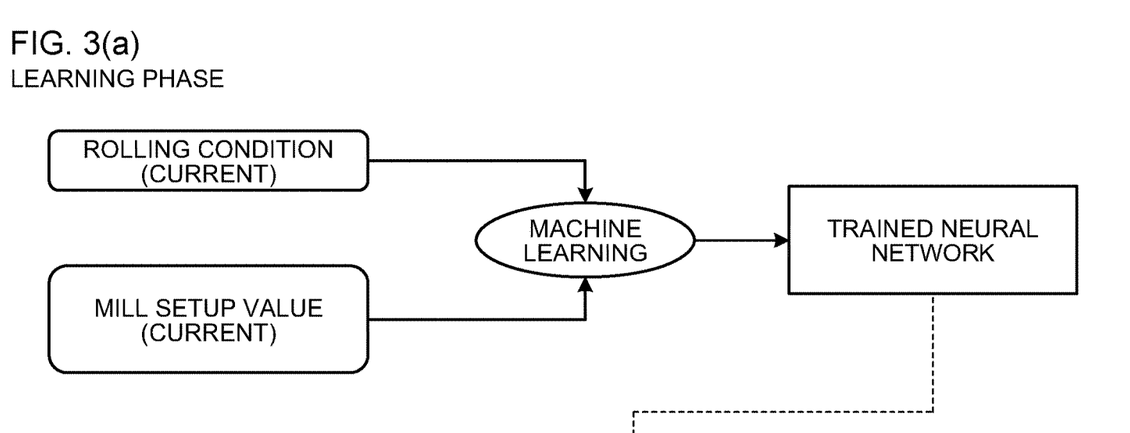
FIGS. 3(a) and (b) are diagrams illustrating (a) a learning phase and (b) a recognizing phase in a conventional mill setup value determining method.

First, in the learning phase, as illustrated in FIG. 3(a), a neural network is trained such that rolling conditions for the current steel sheets W are input and mill setup values for the current steel sheets W are output, and a trained neural network is thereby generated. In the recognizing phase, as illustrated in FIG. 3(b), by inputting rolling conditions for the current steel sheet W to the trained neural network generated in the learning phase, mill setup values for the current steel sheet W are obtained as output.

However, in actual operation, instead of using the current mill setup values obtained in the recognizing phase as is, modification (hereinafter "modification by manual intervention") of the setup conditions (the setup values) by an operator's manual manipulation as appropriate is performed depending on the status of the rolling mill facilities and mill setup values reflecting this modification by manual intervention are used as final setup values.

Examples of a situation where modification by an operator's manual intervention is performed include: (1) when allocation of rolling reductions to rolling stands is desired to be changed to distribute loads concentrating in a part of motors of the rolling stands over the other motors; (2) when allocation of rolling reductions to rolling stands is desired to be changed to prevent the steel sheet from slipping because a part of rolling rolls of the rolling stands has been worn away; and (3) when allocation of rolling reductions to rolling stands is desired to be changed because the rolled steel may wind its way at an entrance of the rolling stands.

Figure 3B:
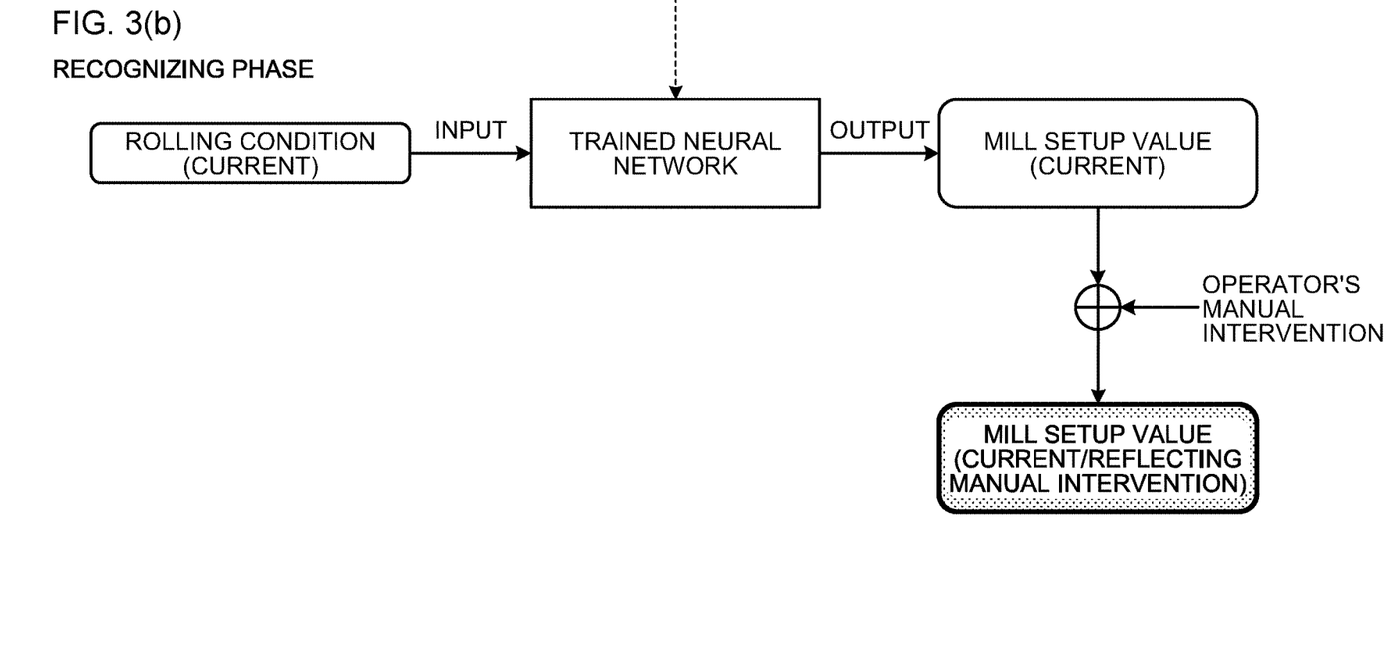

Furthermore, in the conventional methods of determining mill setup values, steel sheets processed previously and currently are considered as independent steel sheets and thus mill setup values are predicted assuming that "mill setup values for the previous and current steel sheets are not related to each other." Therefore, in the recognizing phase (see FIG. 3(b)), when, for example, rolling conditions such as steel types, are the same, regardless of the status of the rolling mill facilities and the previous mill setup values, the same mill setup values are always output.

However, in actual operation, for example, the rolling states such as the frictional states and lubrication states between the steel sheet and the rolling rolls, are preserved, and even if the steel types of the previous steel sheet and the current steel sheet are a little different, similar rolling states usually continue from the previous steel sheet to the current steel sheet.

For example, if a part of the rolling stands tends to cause slipping, the rolling rolls and the lubricant are in a state where slipping easily occurs, and thus even if the steel types of the previous steel sheet and the current steel sheet differ a little, the tendency to cause slipping still continues. Because an on-site operator knows this from experience, even if the rolling conditions for the previous steel sheet and the current steel sheet are a little different, the on-site operator will perform modification by manual intervention so that the previous steel sheet and the current steel sheet have the same mill setup values, or even if the rolling conditions for the previous steel sheet and the current steel sheet are the same, the on-site operator will performs modification by manual intervention so that the previous steel sheet and the current steel sheet have different mill setup values.

In the mill setup value determining method according to this example, by learning beforehand mill setup values including modification by manual intervention through inclusion of relations between the previous and current mill setup values, mill setup values reflecting the above described general rule about the preservation of the rolling states and the operator's empirical rules are thus able to be predicted. In the mill setup value determining method according to this example, specifically, a learning phase and a recognizing phase as illustrated in FIG. 4 are implemented.

Figure 4A:
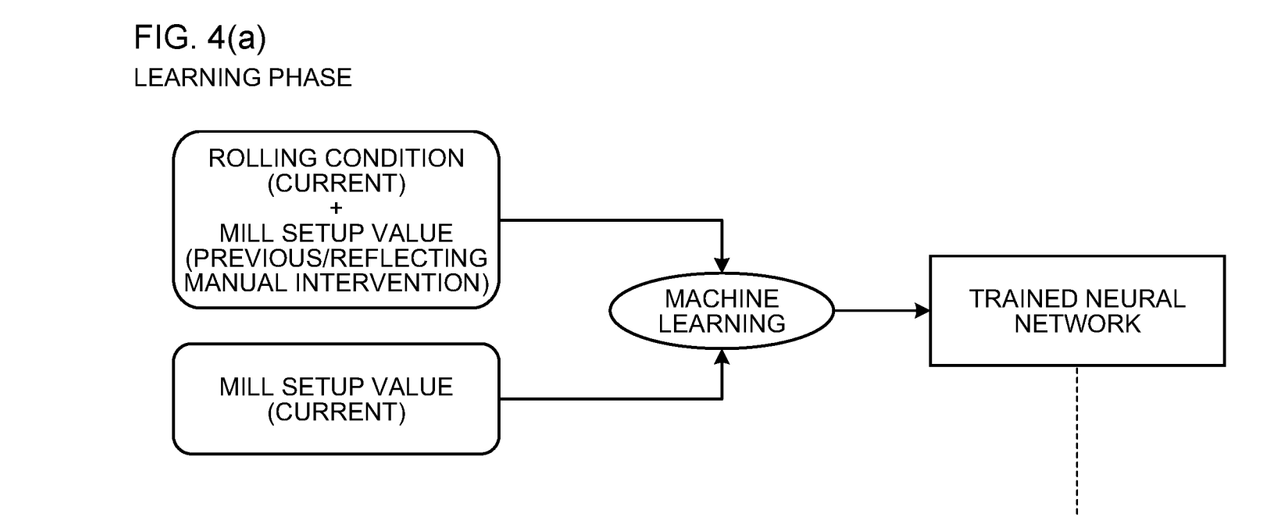
FIGS. 4(a) and (b) are diagrams illustrating (a) a learning phase and (b) a recognizing phase in the mill setup value determining method according to the example.
Figure 4B:
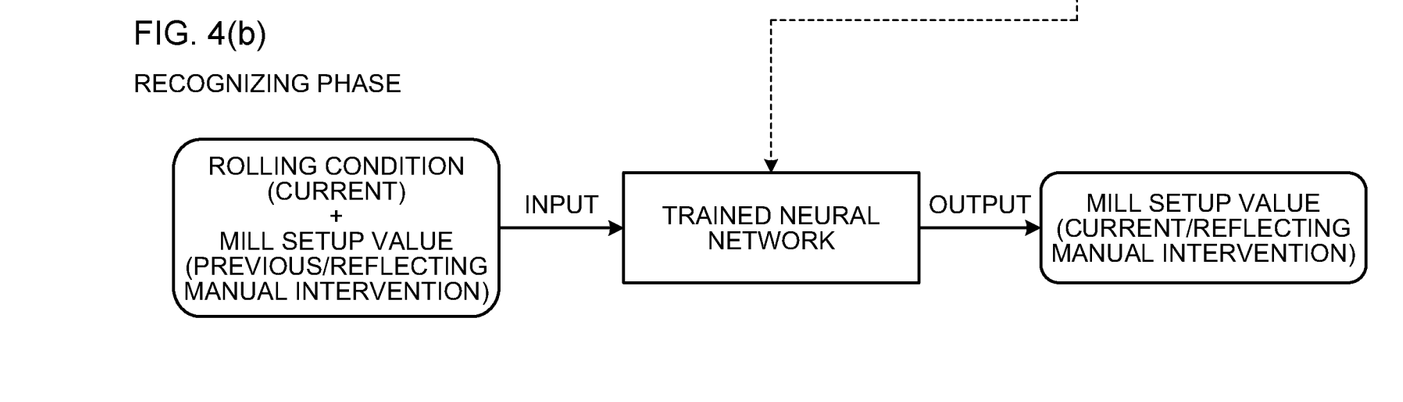

First, in the learning phase, as illustrated in FIG. 4(a), a neural network is trained such that rolling conditions for target steel sheets W (hereinafter "the current steel sheets W") and mill setup values for steel sheets W (hereinafter "the previous steel sheets W") manufacture by the same rolling mill 2 before manufacture of the current steel sheets W are input and mill setup values for the current steel sheets W are output, and a trained neural network is thereby generated. In the recognizing phase, as illustrated in FIG. 4(b), by inputting rolling conditions for the current steel sheet W and mill setup values for the previous steel sheet W into the trained neural network, mill setup values for the current steel sheet W are obtained as output.

The term "mill setup values for the previous steel sheet W" refers to final mill setup values reflecting results of modification by an operator's manual intervention. Furthermore, the term "mill setup values for the previous steel sheet W" refers to mill setup values for a steel sheet W manufactured immediately before the current steel sheet W.

Each process of the mill setup value determining method according to this example will be specifically described below. In this example, a learning process (a learning phase) and a mill setup value calculating process (a recognizing phase) are performed in this order. First, in the learning process, the learning device 7 executes a first learning process and a second learning process.

In the first learning process, learning is performed by inclusion of relations between mill setup values for the previous and current steel sheets W. That is, in the first learning process, a first trained neural network is generated by preparing a large amount of training data for learning (hereinafter "learning data"), from past operation records, and training a neural network, the training data having: as input, rolling conditions for the current steel sheets W and mill setup values that are for the previous steel sheets W and that reflect modification by an operator's manual intervention; and as output, mill setup values for the current steel sheets W.

If modification by manual intervention has been performed for the current steel sheet W, setup values reflecting this modification by manual intervention are preferably used as "mill setup values for the current steel sheet W" used in the learning, but setup values not reflecting the modification by manual intervention (that is, setup values calculated in the recognizing phase) may be used in the learning without any problem.

In the second learning process, learning is performed without inclusion of the relations between mill setup values for the previous and current steel sheets W. That is, in the second learning process, a second trained neural network is generated by training a neural network, with input being the rolling conditions for the current steel sheets W and output being the mill setup values for the current steel sheets W.

Figure 5:
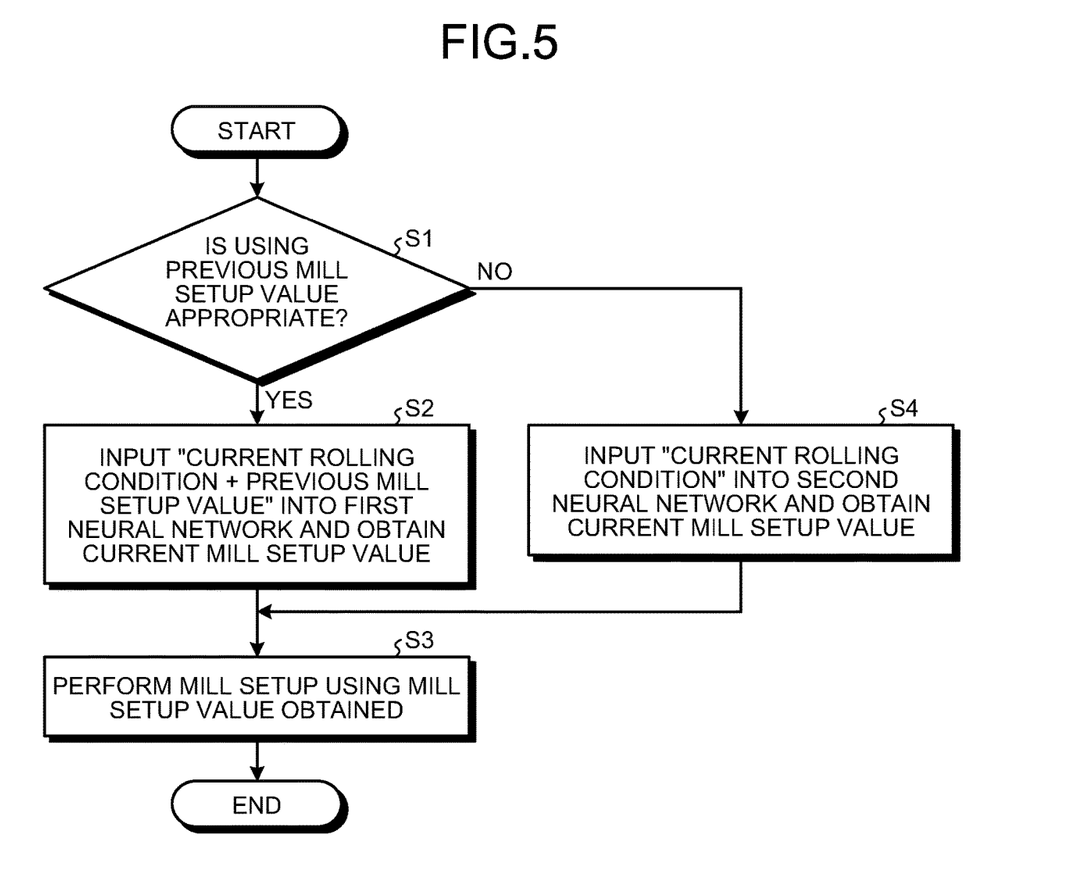
FIG. 5 is a flowchart illustrating steps of the mill setup value determining method according to the example.
Figure 6A:
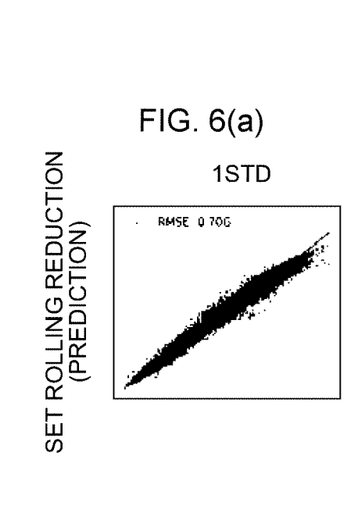
FIGS. 6(a) to (e) are scatter diagrams for examples of the mill setup value determining method, the scatter diagrams illustrating relations between setup values (prediction) for rolling reduction of rolling stands predicted by trained neural networks and setup values (past records) for rolling reduction actually set by an operator for the rolling stands, the trained neural networks having been trained with input including the previous setup values for rolling reduction.
Figure 6B:
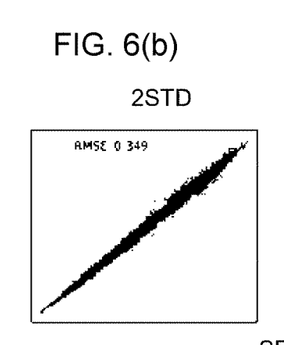
Figure 6C:
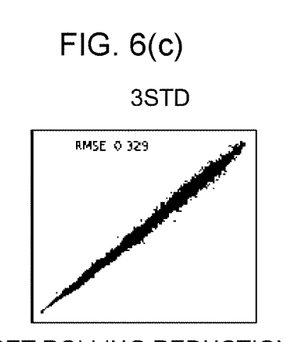
Figure 6D:
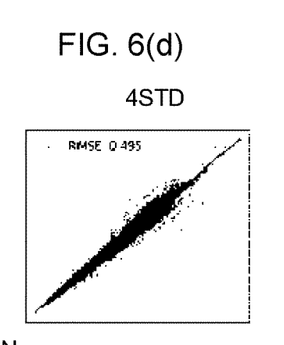
Figure 6E:
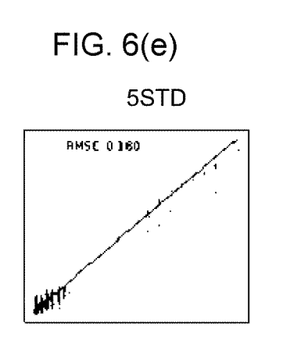
Figure 7A:
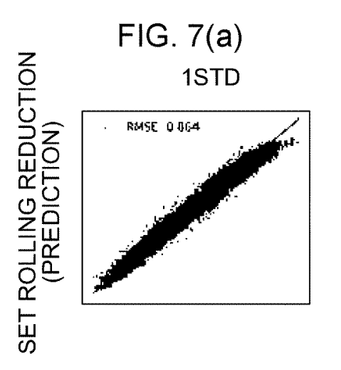
FIGS. 7(a) to (e) include scatter diagrams for comparative examples of the mill setup value determining method according to the example, the scatter diagrams illustrating relations between setup values (prediction) for rolling reduction of rolling stands predicted by trained neural networks and setup values (past records) for rolling reduction actually set by an operator for the rolling stands, the trained neural networks having been trained with input not including the previous setup values for rolling reduction.
Figure 7B:
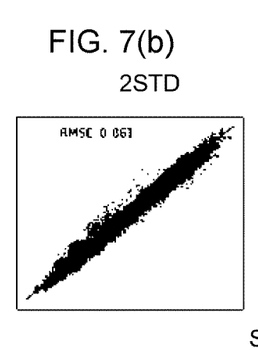
Figure 7C:
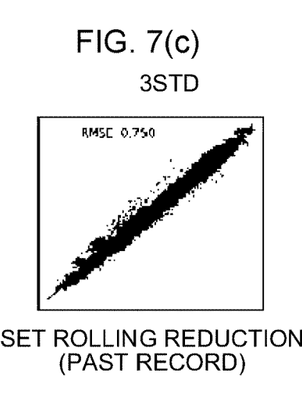
Figure 7D:
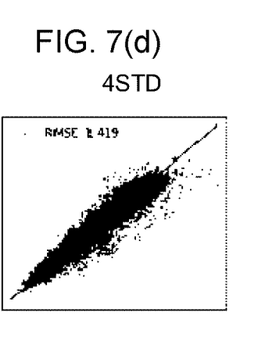
Figure 7E:
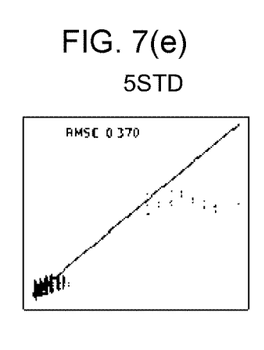

In the mill setup value calculating process, as illustrated in FIG. 5, the mill setup value calculating device 6 determines whether or not using the previous mill setup values is appropriate (Step S1). In this step, for example, a positive determination is made if similar rolling states are continuing (if the rolling states have not changed) from the previous steel sheet W to the current steel sheet W, and a negative determination is made if similar rolling states are not continuing (if the rolling states have changed) from the previous steel sheet W to the current steel sheet W.

At Step S1, if it is determined that using the previous mill setup values is appropriate (Yes at Step S1), the mill setup value calculating device 6 obtains, as output, mill setup values for the current steel sheet W by inputting rolling conditions for the current steel sheet W and mill setup values for the previous steel sheet W, into the first trained neural network (Step S2). The process calculator 5 then performs mill setup by using the mill setup values obtained (Step S3) and ends this process.

Positively determining at Step S1 that "using the previous mill setup values is appropriate" means that because the rolling states have not changed from the previous steel sheet W to the current steel sheet W, using the previous mill setup values for predicting the current mill setup values increases the possibility that mill setup values desired by an operator (following the operator's empirical rules) will be predicted.

If it is determined at Step S1 that using the previous mill setup values is not appropriate (No at Step S1), the mill setup value calculating device 6 obtains, as output, mill setup values for the current steel sheet W by inputting rolling conditions for the current steel sheet W into the second trained neural network (Step S4), and proceeds to Step S3.

Negatively determining at Step S1 that "using the previous mill setup values is not appropriate" means that because the rolling states change from the previous steel sheet W to the current steel sheet W, for example, immediately after reassembly of the rolling rolls, using the previous mill setup values for predicting the current mill setup values increases the possibility that mill setup values not desired by an operator (not following the operator's empirical rules) will be predicted.

The above described mill setup value determining method and mill setup value determining device according to this example facilitate obtainment of mill setup conditions reflecting results of modification by manual intervention of mill setup values through an operator's determination by using trained neural networks that have been trained by inclusion of relations between mill setup values for the previous and current steel sheets W.

Furthermore, in the above mentioned method disclosed in Akira Murakami et al., because optimization based on a mathematical model is performed, the model needs to be remade when rolling conditions change, for example, but with the mill setup value determining method and mill setup value determining device according to this example, such remaking of a model is not needed.

Modified Example

In the mill setup value determining method according to this example, the neural networks may learn rolling conditions for the previous steel sheets W, in addition to rolling conditions for the current steel sheets W, in the learning process.

In this example, in the learning process executed beforehand, a neural network is trained to generate a trained neural network, with input being rolling conditions for the current steel sheets W, rolling conditions for the previous steel sheets W, and mill setup values for the current steel sheets W, and output being mill setup values for the current steel sheets W. In the mill setup value calculating process, mill setup values for the current steel sheet W are obtained as output by inputting rolling conditions for the current steel sheet W, rolling conditions for the previous steel sheet W, and mill setup values for the previous steel sheet W, into the trained neural network.

As described above, using a trained neural network trained by inclusion of relations between rolling conditions for the previous and current steel sheets W improves prediction accuracy for mill setup conditions.

Set Condition Determining Method for Manufacturing Facilities

The above example has been described with the rolling mill facilities 1 serving as an example of manufacturing facilities, but my methods are broadly applicable to manufacturing facilities other than the rolling mill facilities 1. For example, in a setup condition determining method for manufacturing facilities upon change of a product in the manufacturing facilities, a learning process and a setup condition calculating process are executed in this order.

In this learning process, a trained neural network is generated by training a neural network, with input being manufacturing conditions for a target product and setup conditions that are for a product manufactured in the same manufacturing facilities before manufacture of the target product and that reflect modification of the setup conditions by an operator's manual manipulation, and output being setup conditions for the target product. In the setup condition calculating process, setup conditions for the target product are obtained as output by inputting manufacturing conditions for the target product and setup conditions that are for the product manufactured in the same manufacturing facilities before the manufacture of the target product and that reflect modification of the setup conditions by an operator's manual manipulation.

This setup condition determining method for manufacturing facilities enables prediction of setup conditions reflecting results of modification by manual intervention of setup conditions through an operator's determination, by using a trained neural network that has been trained by inclusion of relations between setup conditions for the previous and current products.

EXAMPLES

My methods will be described more specifically with examples. FIGS. 6(a) to (e) correspond to examples and are scatter diagrams illustrating relations between: setup values (prediction) for rolling reduction of rolling stands predicted by trained neural networks on the basis of my methods; and setup values (past records) for rolling reduction actually set by an operator for the rolling stands, the trained neural networks having been trained with input including the previous setup values for rolling reduction.

Furthermore, FIGS. 7(a) to (e) correspond to comparative examples and are scatter diagrams illustrating relations between: setup values (prediction) for rolling reduction of rolling stands predicted by trained neural networks on the basis of the method disclosed in JP '511; and setup values (past records) for rolling reduction actually set by an operator for the rolling stands, the trained neural networks having been trained with input not including the previous setup values for rolling reduction. In FIGS. 6 and 7, the vertical axis represents the setup values (prediction) for rolling reduction of the rolling stands, and the horizontal axis represents the setup values (past records) for rolling reduction of the rolling stands. In addition, in the examples, the sheet thickness, sheet width, steel type, and roll specifications (such as roll diameters) of the rolling stands were used as rolling conditions for steel sheets W in the learning process and mill setup value calculating process.

As illustrated in FIGS. 6 and 7, using my methods increases the precision of reproducibility of the setup values for rolling reduction of the rolling stands, from that when the method disclosed in JP '511 is used. That is, compared to the method disclosed in JP '511, my methods reduce the room mean squared error (RMSE) by about 52% on average among the rolling stands, and the errors between the setup values for rolling reduction of the rolling stands (prediction) and the setup values for rolling reduction of the rolling stands (past records) actually set by the operator (following the operator's empirical rules) have thus been reduced.

My setup condition determining method for manufacturing facilities, the mill setup value determining method for a rolling mill, the mill setup value determining device for a rolling mill, the product manufacturing method, and the rolled material manufacturing method have been specifically described above through examples, but the scope of this disclosure is not to be limited to the description thereof and must be broadly interpreted on the basis of the appended claims. Furthermore, various changes and modifications, for example, based on the description are also included herein.

For example, the mill setup value determining method according to the example has been described with steel sheets W such as coils serving as an example of the rolled material, but any other material such as aluminum may be a target material.

Furthermore, in the above described mill setup value determining method according to the example, the mill setup value calculating process is executed by using two trained neural networks generated in the learning process, but the mill setup value calculating process may be performed by generating only one trained neural network in the learning process and using the single trained neural network. In this example, the same neural network is trained in the first learning process and second learning process to generate the single trained neural network.

The first learning process is executed when similar rolling states are continuing (the rolling states have not changed) from the previous steel sheet W to the current steel sheet W and mill setup values for the previous and current steel sheets W are related to each other. In the first learning process, the neural network is caused to perform learning with input being rolling conditions for the current steel sheets W and mill setup values for the previous steel sheets W, and output being mill setup values for the current steel sheets W.

The second learning process is executed when similar rolling states are not continuing (the rolling states have changed) from the previous steel sheet W to the current steel sheet W and mill setup values for the previous and current steel sheets W are not related to each other. In the second learning process, the neural network is caused to perform learning with input being rolling conditions for the current steel sheets W and mill setup values for the previous steel sheets W, and output being mill setup values for the current steel sheets W. However, in the second learning process, the neural network is trained by setting the mill setup values for the previous steel sheets W to a fixed value such as "0," for example, such that the mill setup values for the previous steel sheets W do not contribute to the output in the mill setup value calculating process.

According to the above description, the first learning process is executed "when the mill setup values for the previous and current steel sheets W are related to each other" and the second learning process is executed "when the mill setup values for the previous and current steel sheets W are not related to each other," but a trained neural network similar to that obtained when the above described first and second learning processes are executed is able to be obtained, for example, by preparing first learning data and second learning data and causing the first and second learning data to be learned in a single learning process, the first learning data including mill setup values for the previous steel sheets W, the second learning data including mill setup values for the previous steel sheets W that have been fixed to "0."

Subsequently, in the mill setup value calculating process, rolling conditions for the current steel sheet W and mill setup values for the previous steel sheet W are input to the trained neural network to obtain mill setup values for the current steel sheet W as output. However, in the mill setup value calculating process, if similar rolling states are not continuing from the previous steel sheet W to the current steel sheet W and the mill setup values for the previous and current steel sheets W are not related to each other, for example, "0" is input as mill setup values for the previous steel sheet W into the trained neural network.

Mill setup values for when similar rolling states are continuing from the previous steel sheet W to the current steel sheet W and mill setup values for when similar rolling states are not continuing from the previous steel sheet W to the current steel sheet W are thereby each able to be predicted using a single trained neural network.

Furthermore, learning using neural networks is performed in the learning processes in the above described mill setup value determining method according to the example, but a trained model may be generated by learning using a machine learning means other than a neural network, the machine learning means being, for example, a decision tree capable of handling time-series data, or a support vector machine.

Furthermore, my methods are applicable to processes other than mill setup processes. For example, my methods are effective for hot rolling because hot rolling also involves determination of a draft schedule like the flow described in Kozo Nakai et al. mentioned above. In addition, my methods also work particularly effectively for reverse rolling like thick plate rolling because reverse rolling has many occasions to change setup values through an operator's determination of the previous rolling states such as frictional states and lubrication states.

Furthermore, controlling the coating weight in a galvanized steel sheet manufacturing line is typically performed by a method called gas wiping. In this example, because the coating weight is unable to be measured accurately until the state of the zinc coating has been stabilized, a weight sensor is typically installed at a location that is about 100 meters away from the zinc pot and a large time delay is thus generated in the feedback control. Therefore, settings of the wiping facilities are changed at the time when the welding point passes the zinc pot.

By applying my methods to such control of the coating weight in a galvanized steel sheet manufacturing line to cause a neural network to learn relations between setup values for the wiping facilities for steel sheets before welding points and steel sheets after the welding points and use the result of the learning, setup values for the wiping facilities are able to be obtained, the setup values reflecting results of modification by manual intervention of setup values through an operator's determination.

Furthermore, controlling the coating alloying in a galvanized steel sheet manufacturing line is performed by induction heating and gas heating. In this example, because the degree of alloying is unable to be measured accurately until alloying of the zinc coating has been completed, an alloying sensor is typically installed at a location that is about 100 meters away from the zinc pot and a large time delay is thus generated in the feedback control. Therefore, settings of the heating facilities are changed at the time when the welding point passes the alloying heating section.

By applying my methods to such control of the coating alloying in a galvanized steel sheet manufacturing line to cause a neural network to learn relations between setup values for the heating facilities for steel sheets before welding points and steel sheets after the welding points and use the result of the learning, setup values for the heating facilities are able to be obtained, the setup values reflecting results of modification by manual intervention of setup values through an operator's determination.

Furthermore, a product is able to be manufactured by manufacturing facilities by applying the setup condition determining method for manufacturing facilities to a product manufacturing method and setting setup conditions determined by the setup condition determining method for manufacturing facilities, for the manufacturing facilities. In addition, a rolled material is able to be manufactured by a rolling mill by applying the mill setup value determining method for a rolling mill to a rolled material manufacturing method and setting mill setup values for the rolling mill, the mill setup values having been determined by the mill setup value determining method.

The invention claimed is:

1. A mill setup value determining method for a rolling mill, comprising:
  a mill setup value calculating step of:
    inputting, into a trained model, a mill setup value for a target rolled material and a mill setup value that is for a rolled material manufactured by the rolling mill before manufacture of the target rolled material and that reflects setup value modification by an operator's manual manipulation; and
    obtaining a mill setup value for the target rolled material, wherein
  the trained model has been trained with input comprising:
    manufacturing conditions for the target rolled material; and
    mill setup values that are for the rolled material manufactured by the rolling mill before the manufacture of the target rolled material and that reflect setup value modification by an operator's manual manipulation, and
    output being mill setup values for the target rolled material;
  wherein
    the trained model includes:
    a first trained model obtained by training a learning model with input comprising:

manufacturing conditions for the target rolled material; and mill setup values that are for a rolled material manufactured by the rolling mill before manufacture of the target rolled material and that reflect modification by an operator's manual manipulation, and output being mill setup values for the target rolled material; and a second trained model obtained by training a learning model with input being manufacturing conditions for the target rolled material, and output being mill setup values for the target rolled material, and the mill setup value calculating step includes:

obtaining, as output, a first mill setup value for the target rolled material by inputting, into the first trained model, a manufacturing condition for the target rolled material and a mill setup value for a rolled material manufactured by the rolling mill before the manufacture of the target rolled material, if it is determined, on the basis of a predetermined determination condition, that using a previous mill setup value is appropriate;

obtaining, as output, a second mill setup value for the target rolled material by inputting, into the second trained model, a manufacturing condition for the target rolled material, if it is determined, on the basis of the predetermined determination condition, that using the previous mill setup value is not appropriate; and changing a setting of the rolling mill with the obtained first or second mill setup values.

2. The mill setup value determining method for a rolling mill according to claim 1, wherein the trained model is obtained by training a learning model with input comprising:

manufacturing conditions for a target rolled material;

manufacturing conditions for a rolled material manufactured by the rolling mill before manufacture of the target rolled material; and mill setup values that are for the rolled material manufactured by the rolling mill before the manufacture of the target rolled material and that reflect setup value modification by an operator's manual manipulation, and output being mill setup values for the target rolled material, and the mill setup value calculating process includes obtaining, as output, a mill setup value for the target rolled material by inputting, into the trained model, a manufacturing condition for the target rolled material, a manufacturing condition for the rolled material manufactured by the rolling mill before the manufacture of the target rolled material, and a mill setup value for the rolled material manufactured by the rolling mill before the manufacture of the target rolled mill.

3. A rolled material manufacturing method comprising:
allocating one or more rolling conditions; and
manufacturing a rolled material with the allocated one or more rolling conditions using the changed setting according to claim 1.

4. A mill setup value determining device for a mill setup process for a rolling mill, the mill setup value determining device comprising:

a mill setup value calculating device configured to obtain, as output, a mill setup value for a target rolled material by inputting, into a trained model, a manufacturing condition for the target rolled material and a mill setup value for a rolled material manufactured by the rolling mill before manufacture of the target rolled material, wherein the trained model is obtained by training a learning model with input comprising:

manufacturing condition for the target rolled material; and mill setup values that are for the rolled material manufactured by the rolling mill before the manufacture of the target rolled material and that reflect setup value modification by an operator's manual manipulation, and output being mill setup values for the target rolled material;

wherein the trained model includes:

a first trained model obtained by training a learning model with input comprising:

manufacturing conditions for the target rolled material; and mill setup values that are for a rolled material manufactured by the rolling mill before manufacture of the target rolled material and that reflect modification by an operator's manual manipulation, and output being mill setup values for the target rolled material; and a second trained model obtained by training a learning model with input being manufacturing conditions for the target rolled material, and output being mill setup values for the target rolled material, and the mill setup value calculating process includes:

obtaining, as output, a first mill setup value for the target rolled material by inputting, into the first trained model, a manufacturing condition for the target rolled material and a mill setup value for a rolled material manufactured by the rolling mill before the manufacture of the target rolled material, if it is determined, on the basis of a predetermined determination condition, that using a previous mill setup value is appropriate; and obtaining, as output, a second mill setup value for the target rolled material by inputting, into the second trained model, a manufacturing condition for the target rolled material, if it is determined, on the basis of the predetermined determination condition, that using the previous mill setup value is not appropriate; and a control device configured to change a setting of the rolling mill with the obtained first or second mill setup value.

5. A rolled material manufacturing method comprising:
allocating one or more rolling conditions; and
manufacturing a rolled material with the allocated one or more rolling conditions using the changed setting according to claim 4.

* * * * *